United States Patent [19]
Gantt

[11] Patent Number: 5,633,837
[45] Date of Patent: May 27, 1997

[54] AUTOMOBILE RADIO RECORDING SYSTEM

[76] Inventor: Zaidy L. Gantt, 2060 NW. 48th Ter., Condominium # 210, Fort Lauderdale, Fla. 33313

[21] Appl. No.: 541,124

[22] Filed: Oct. 11, 1995

[51] Int. Cl.[6] .................................................. H04H 9/00
[52] U.S. Cl. ........................................ 369/7; 369/6
[58] Field of Search .................... 369/7, 6, 1, 84, 369/85, 21; 360/7, 13, 15, 14.1; 455/33.1, 32.1, 36.1

[56] References Cited

U.S. PATENT DOCUMENTS 4,713,801 12/1987 Hale ............................................. 369/7
5,345,430 9/1994 Moe ............................................. 369/7
5,448,534 9/1995 Okada ........................................ 369/7

*Primary Examiner*—Ali Neyzari
*Attorney, Agent, or Firm*—Michael I. Kroll

[57] ABSTRACT

An automobile recorder allows a user to continuously record the contents of radio programs onto a solid state memory and then transfer selected portions to a cassette tape or recordable compact disk. The auto recorder prevents unnecessary wear on the tape mechanism and tape by requiring use of these only when the tape transfer is made or the tape is being played back. A second optional AM/FM tuner allows the user to listen to one program while recording another program onto the solid state memory. Extended recording capability is provided.

6 Claims, 2 Drawing Sheets

5,633,837

AUTOMOBILE RADIO RECORDING SYSTEM

BACKGROUND OF THE INVENTION

The instant inventions relates, generally, to the field of automobile entertainment systems, and, more specifically, to automobile electronic systems with recording capabilities. At present drivers spend a great deal of time listening to music while driving. Many of the songs heard on the auto radio are the tunes that the driver would like to have as permanent recordings. However, this individual is typically forced to purchase the entire album in order to obtain a recording of the desired song. In some instances, auto car radios are equipped with a tape cassette deck; however, if the user attempts to continuously record in order to not miss a song, the tape mechanism and the tape will wear out through constant use.

BACKGROUND OF THE PRIOR ART

A number of inventions have been suggested to address the above stated problems. For instance, Shu et. al. (U.S. Pat. No. 5,050,021) suggests an expanded micro cassette player-recorder; Yamada et. al (U.S. Pat. No. 5,053,901) suggests a threading device for tape recorder including a tension arm abutted against a slide block in an initial position; and Ohmori et. al. (U.S. Pat. No. 5,065,264) suggest a capstan arrangement for a magnetic recording/reproduction apparatus. However, these inventions do not pertain to auto installations and use magnetic recording media only.

SUMMARY OF THE INVENTION

It is, therefore, a primary object of the present invention to provide an auto recorder that records conventional automobile radio output onto a solid state memory.

Another object is to provide an auto recorder that allows the program recorded onto the solid state memory to be permanently stored onto a conventional cassette.

Yet another object is to provide an auto recorder that allows the program recorded onto the solid state memory to be permanently stored onto a recordable compact disk.

Another object is to provide an auto recorder that provides extended recording capability.

A still further object is to provide an auto recorder that fits into the same space as conventional auto radios and stereo systems.

A further object is to provide an auto recorder that is simple and inexpensive to fabricate and easy to use while in motion.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
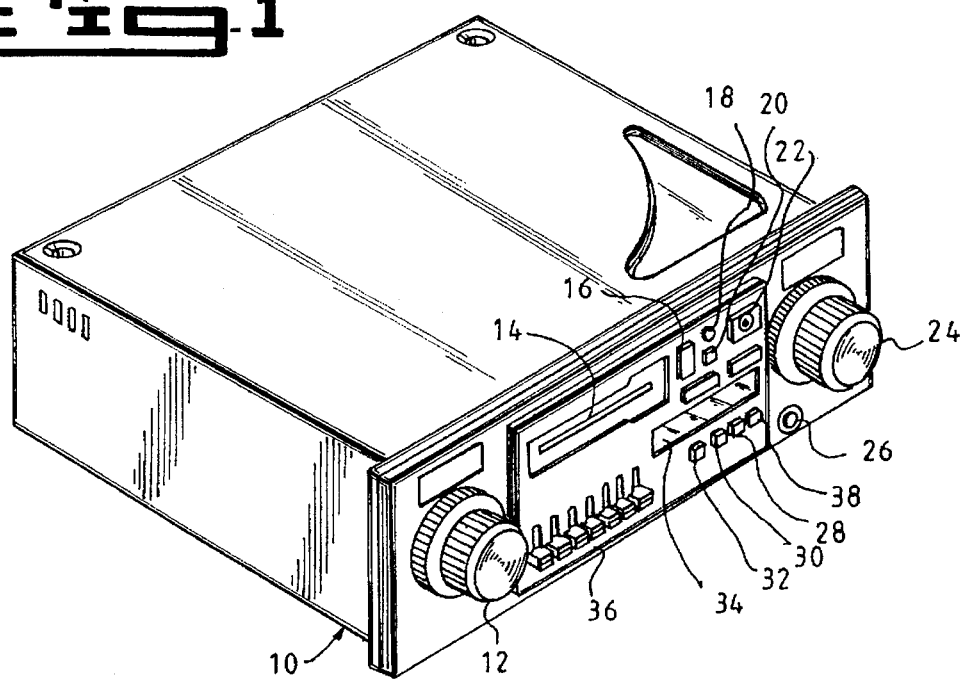
FIG. 1 is a perspective view of the invention, an in-dash stereo unit.
Figure 5:
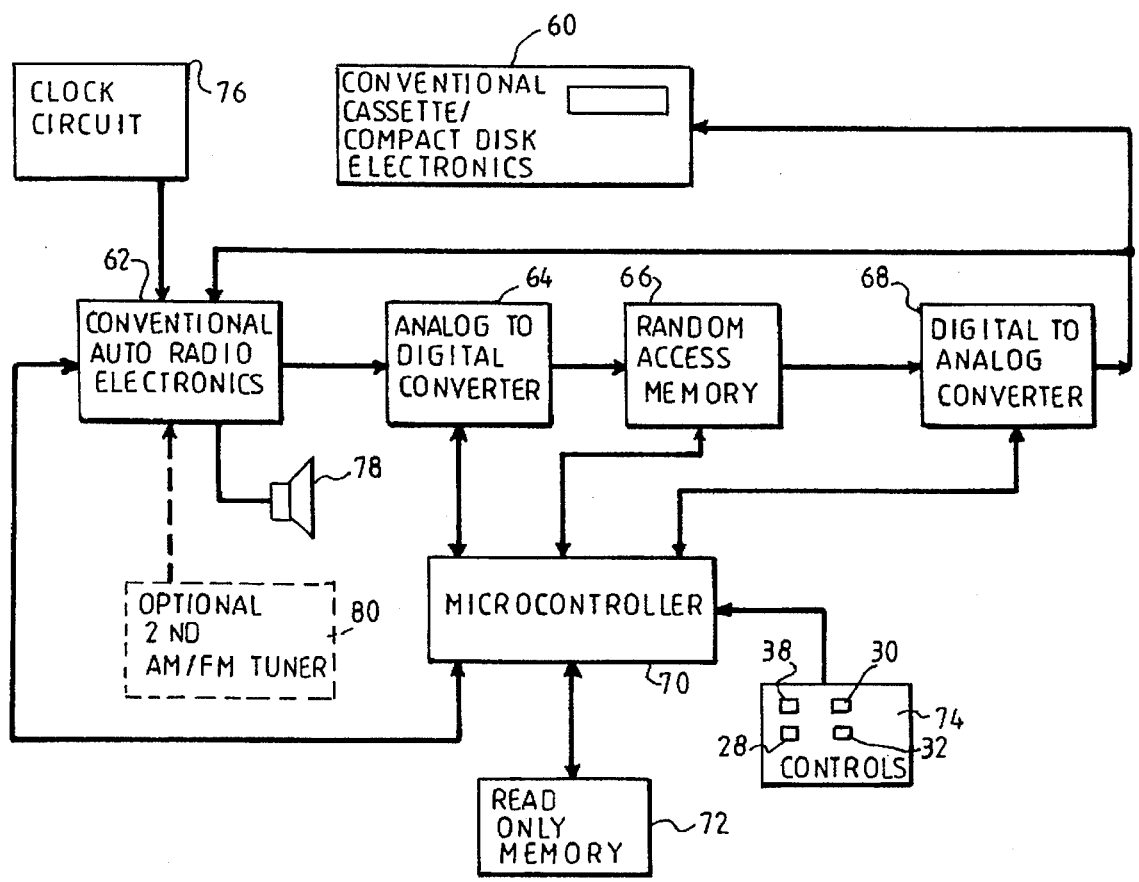
FIG. 5 is an electronic block diagram of the invention.

The operation of the invention is best understood by first referring to FIG. 5, the electronic block diagram of the invention. The auto recorder (10 in FIG. 1) contains conventional auto radio electronics circuits 62 with typical volume control 12, tuning knob 24, equalizer 36, and clock display 34. In operation, when the user operates the memory controls 74, comprising memory control buttons 28,30,32, and 38, the microcontroller 70 signals the conventional auto radio circuit 62 to output the radio audio signals to analog-to-digital converter 64. The analog-to-digital converter 64 converts the radio's analog signal to a digitized form capable of storing in solid state memory. This digitized information is stored in random access memory 66. In order to prevent loss of memory should power be disconnected, random access memory 66 may be made non volatile through the use of a battery backup or a nonvolatile semiconductor technology.

When the user chooses to record the program onto a cassette tape, he depresses one of the memory controls 74, which commands microcontroller 70 to dump the contents of random access memory 66 into digital to analog converter 68 and thereby into cassette recorder 60. It should be noted that recent advances in recordable compact disks now make it possible to record onto compact disk as well as cassette, so the cassette can be supplemented or replaced by a compact disk recorder.

The permanent operating instructions for microcontroller 70 are contained in read only memory 72. The time and date are displayed on display 34 by clock circuit 76. This clock circuit can also be used to auto record at some predetermined time.

One option to the invention is the addition of a second AM/FM tuner 80. This second tuner allows the user to listen to a radio program through speaker 78 while recording a different program occurring simultaneously on a different radio channel.

Figure 2:
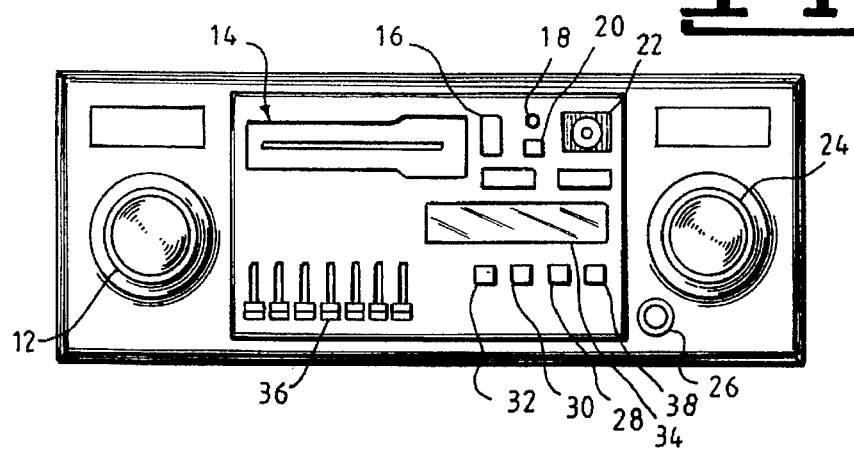
FIG. 2 is a view of the front panel of a first embodiment of the invention.

The first embodiment of the invention, shown in FIG. 2. This embodiment employs a single cassette recorder 14 with eject button 16. It offers a record light 18, Dolby noise reduction button 20, and record button 22.

Figure 3:
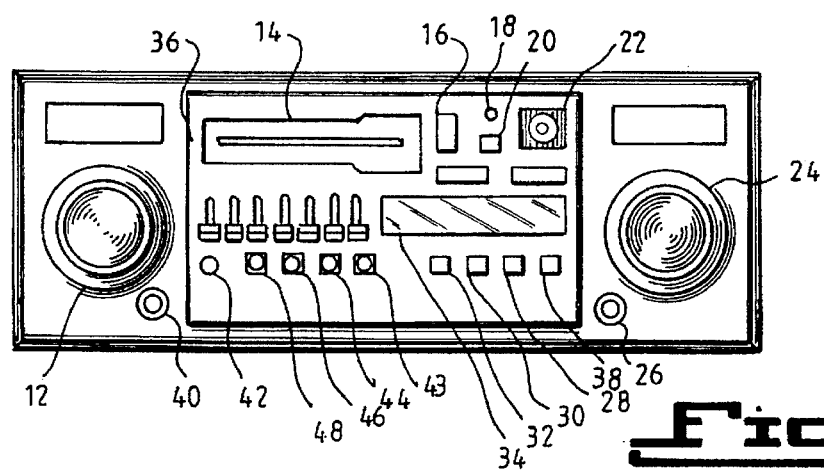
FIG. 3 is a view of the front panel of a second embodiment of the invention showing the addition of a microphone input and a built-in security system.
Figure 4:
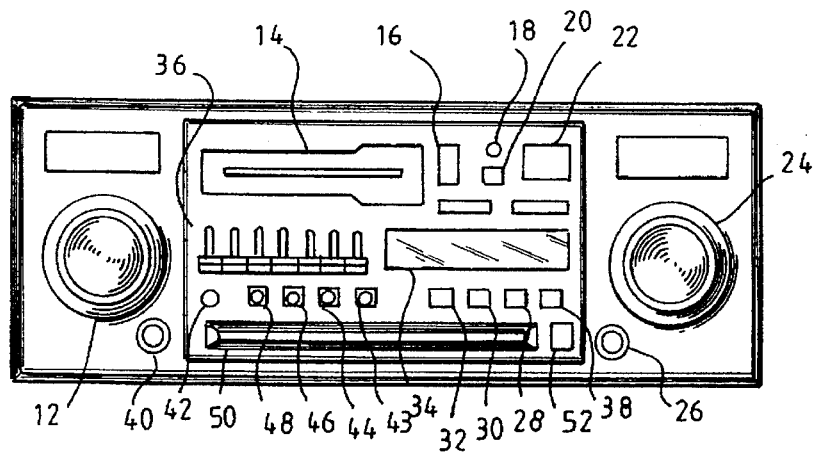
FIG. 4 is a view of the front panel of a third embodiment of the invention showing the addition to a compact disk recorder/player.

The second embodiment, shown in FIG. 3, offers the addition of security circuits operated by security code buttons 43,44,46, and 48, as well as a microphone jack 40 and microphone push button switch 42.

The third embodiment, shown in FIG. 3, is similar to the second embodiment, and adds a compact disk player/recorder 50 with eject button 52.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An automobile recorder, comprising:

a. a conventional automobile radio electronics circuit;

b. a conventional cassette recorder connected directly to receive the analog output of said radio electronics circuit;

c. an analog to digital converter in parallel with said cassette recorder directly connected to receive the analog output of said radio electronics circuit and has as its output a digitized version of said analog input, said analog to digital converter being normally blocked from receiving said radio circuit output;

d. a random access memory that stores said digitized version for later recording by said cassette recorder without time delay, wherein the input to said random access memory is the output of said analog to digital converter;

e. a digital to analog converter whose input is the digitized output of said random access memory, wherein said digital to analog converter has as its output the restored analog output of said automobile radio electronics circuit such that said analog output may be recorded onto said conventional cassette recorder at a later time;

f. a microcontroller to unblock said analog to digital converter to receive the analog output of said electronics circuit and to order and operate said conventional automobile radio electronics circuit, said conventional cassette recorder, said analog to digital converter, said random access memory, and said digital to analog converter, according to program instructions;

g. a read only memory that permanently stores said program instructions; and, h. means comprising a multiplicity of controls under the control of a user that changeably enters said program instructions and initiates said microcontroller to unblock said analog to digital converter to permit recording by said cassette recorder the digitized version of the output of said radio circuit at a later time selected by said user.

2. An automobile recorder, as recited in claim 1, further comprising a clock and minute indicator that displays time and date and is connected to said conventional automobile radio electronics circuit such that said clock and minute circuit is used to program the start and stop times of a recording.

3. An automobile recorder, as recited in claim 1, further comprising a microphone input and a microphone switch whereby a microphone can be used as a recording information source.

4. An automobile recorder, as recited in claim 1, further comprising a self-contained security alarm circuit.

5. An automobile recorder, as recited in claim 1, further comprising a compact disk player.

6. An automobile recorder, as recited in claim 1, further comprising a compact disks recorder, whereby the output of said conventional auto radio electronics circuit can be recorded onto a compact disk.

* * * * *